United States Patent
Kamarajugadda et al.

(10) Patent No.: US 10,263,442 B2
(45) Date of Patent: Apr. 16, 2019

(54) APPARATUS AND SYSTEM TO MANAGE CHARGING OPERATION OF ELECTRONIC DEVICE

(71) Applicants: Prathyusha Kamarajugadda, Hyderabad (IN); Kalle Lakshmi Narasimha Sai Prasanth, Anantapur (IN); Ajay Yathindra, Vijayawada (IN)

(72) Inventors: Prathyusha Kamarajugadda, Hyderabad (IN); Kalle Lakshmi Narasimha Sai Prasanth, Anantapur (IN); Ajay Yathindra, Vijayawada (IN)

( * ) Notice: Subject to any disclaimer, the term of this patent is extended or adjusted under 35 U.S.C. 154(b) by 55 days.

(21) Appl. No.: 15/485,859

(22) Filed: Apr. 12, 2017

(65) Prior Publication Data

US 2017/0310134 A1    Oct. 26, 2017

(30) Foreign Application Priority Data

Apr. 22, 2016 (IN) .............................. 201641014140

(51) Int. Cl.
    *H02J 7/00* (2006.01)

(52) U.S. Cl.
    CPC .......... *H02J 7/0045* (2013.01); *H02J 7/0047* (2013.01); *H02J 7/0052* (2013.01); *H02J 2007/005* (2013.01); *H02J 2007/0049* (2013.01); *H02J 2007/0062* (2013.01); *H02J 2007/0096* (2013.01)

(58) Field of Classification Search
    CPC ...... H02J 7/0045; H02J 7/0047; H02J 7/0052; H02J 2007/005; H02J 2007/0049

USPC .......................................................... 320/107
See application file for complete search history.

(56) References Cited

U.S. PATENT DOCUMENTS

| | | | | |
|---|---|---|---|---|
| 5,782,646 A * | 7/1998 | Broadfield | ............. | H01R 27/00 439/346 |
| 6,076,000 A * | 6/2000 | Lee | ........................ | H02J 7/0045 455/569.2 |
| 6,633,932 B1 * | 10/2003 | Bork | ........................ | G06F 1/266 320/107 |
| 9,013,142 B2 * | 4/2015 | Fujitake | ................ | B60K 6/445 320/107 |
| 9,502,912 B2 * | 11/2016 | Li | ........................ | H02J 7/0045 |
| 2015/0171648 A1 * | 6/2015 | Williams | ........... | H01R 13/7175 320/107 |
| 2016/0020806 A1 * | 1/2016 | Richter | ................... | H04M 1/04 455/557 |
| 2016/0025316 A1 * | 1/2016 | Chien | ................... | F21V 23/023 362/253 |
| 2016/0336775 A1 * | 11/2016 | Cho | ...................... | H02J 7/0042 |
| 2017/0256970 A1 * | 9/2017 | Ciesinski | ........... | H01R 13/6675 |

* cited by examiner

*Primary Examiner* — M Baye Diao

(57) ABSTRACT

Embodiments herein provide an apparatus to manage a charging operation of an electronic device. The apparatus includes a first connector adapted to fit into a charging receptacle of the electronic device. A second connector is adapted to connect to the first connector. The second connector includes a switch member configured to detect a status of the second connector. The status of the second connector is in one of a data synchronization mode and an optimal charging mode. A charging member is configured to perform the charging operation based on the status of the second connector.

31 Claims, 15 Drawing Sheets

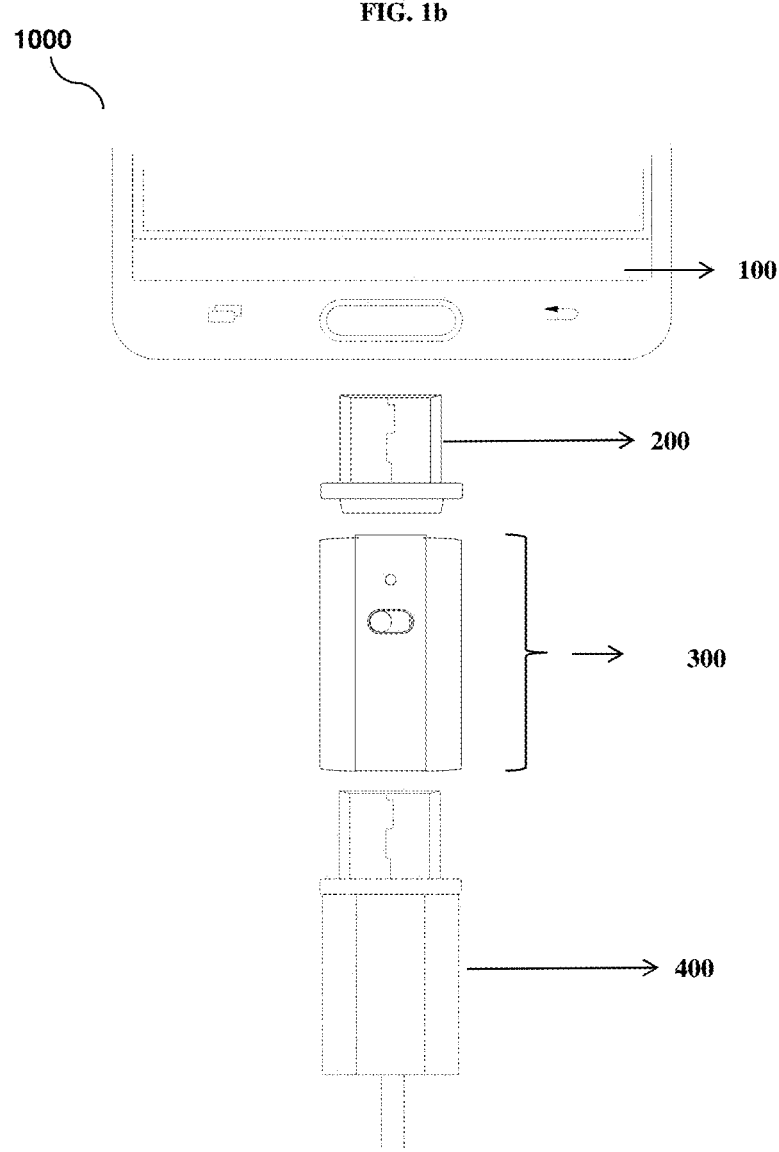

330

300

→ 360
→ 380
→ 350

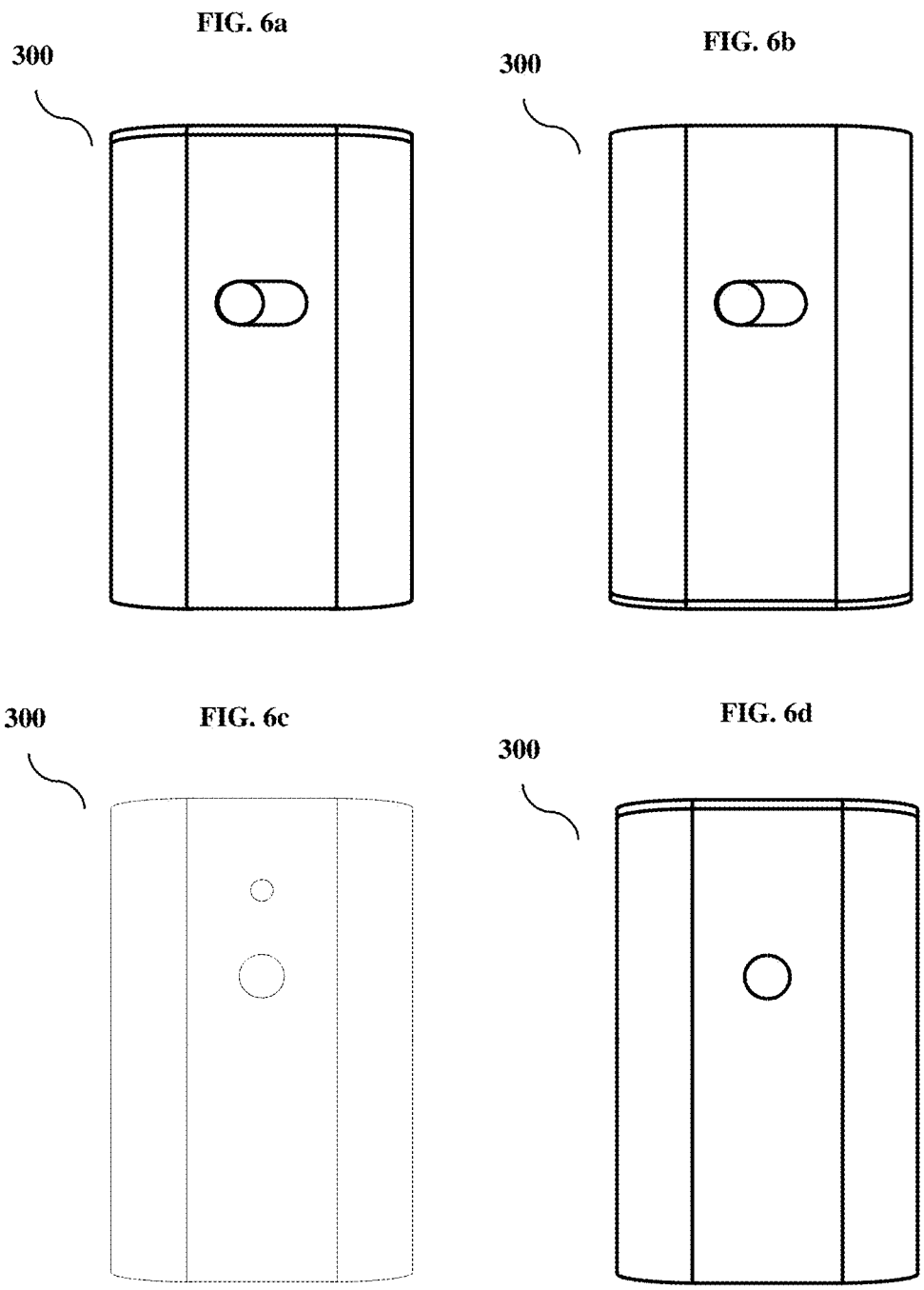

APPARATUS AND SYSTEM TO MANAGE CHARGING OPERATION OF ELECTRONIC DEVICE

TECHNICAL FIELD

The present disclosure relates to a charging system, and more particularly to an apparatus and system to manage a charging operation of an electronic device. The present application is based on, and claims priority from an Indian application No., 201641014140 filed on Apr. 22, 2016 the disclosure of which is hereby incorporated by reference herein.

BACKGROUND

In order to charge the electronic device (e.g., mobile phone, a Personal Digital Assistance (PDA), or the like), a connection between a power source and the electronic device is established using a connector. The connector comprises two ends, where one end of the connector connects with the electronic device and another end of the connector connects with the power source. Further, the connector includes a regulator that converts an input from the power source to a voltage used in the electronic device and supplies the voltage to a battery management system in the electronic device so that the power needed for the electronic device to operate is supplied. But, a user of the electronic device faces various problems while using the connector.

In an example, while charging the electronic device, a data synchronization mode is enabled in the electronic device. The data synchronization mode allows the data synchronization within the electronic device. This results in reducing the speed of the charging operation of the electronic device.

In another example, a laptop computer charges the mobile device slowly due to the mobile phone simultaneously synchronize data to the laptop computer. In another example, the charging from a public charging port and others laptops might not be safe because there might be an unauthorized access to the data stored in the mobile device. Thus, there remains a need of a robust system and apparatus to manage charging operations of the electronic device.

SUMMARY

Embodiments herein disclose an apparatus to manage charging operations of an electronic device. The apparatus includes a first connector adapted to fit into a charging receptacle of the electronic device. A second connector is adapted to connect to the first connector. The second connector includes a switch member configured to detect a status of the second connector. The status of the second connector is in one of a data synchronization mode and an optimal charging mode. A charging member is configured to perform the charging operation based on the status of the second connector.

In an embodiment, the charging member is configured to detect that the status of the second connector is in the optimal charging mode. The charging member is configured to switch data lines to disable a data synchronization operation. Further, the charging member is configured to set a voltage at the data lines based on a type of the electronic device. Further, the charging member is configured to perform the charging operation to charge the electronic device with maximum possible current.

In an embodiment, the voltage at the data lines are dynamically determined based on a dedicated charging port standard of a Universal Serial Bus (USB) battery charging specification set by an original equipment manufacture of the electronic device.

In an embodiment, the charging member is configured to detect that the status of the second connector is in the data synchronization mode. Further, the charging member is configured to enable a data synchronization operation. Further, the charging member is configured to allow for both the charging operation and the data synchronization operation between the power source and the electronic device.

In an embodiment, the data lines are controlled by the power source connected to the distal end of the second connector.

In an embodiment, the second connector includes at least one mode indicator configured to indicate whether the electronic device is in a fully charged mode.

In an embodiment, the second connector includes at least one mode indicator configured to indicate whether the electronic device is in a partially charging mode.

In an embodiment, the second connector includes at least one mode indicator configured to indicate whether the electronic device is connected with the power source.

In an embodiment, the second connector includes at least one mode indicator configured to indicate the status of the electronic device.

In an embodiment, the first connector includes a set of electrical members and a set of magnetic members. The second connector includes a set of magnetic members and a set of electrical members.

In an embodiment, a proximal end of the first connector is adapted to fit into the charging receptacle of the electronic device and a distal end of the first connector is adapted to fit into a proximal end of the second connector.

In an embodiment, a proximal end of the second connector is adapted to fit into a distal end of the first connector and a distal end of the second connector is of adapted to fit into a charging plug of a USB cable.

In an embodiment, a proximal end of the second connector is adapted to fit into a distal end of the first connector and a distal end of the second connector is of adapted to connect with the USB cable.

In an embodiment, the set of magnetics members of the first connector magnetically connect the electronic device with the second connector and the set of electrical members of the first connector electrically connect the electronic device with the second connector.

In an embodiment, the set of magnetics members of the second connector magnetically connect to the electronic device through the first connector and the second set of electrical members of the second connector electrically connect to the electronic device through the first connector.

In an embodiment, the first connector connects to the second connector with a snap when the set of magnetic members of the first connector being adapted to mate with the set of magnetic members of the second connector.

In an embodiment, the set of magnetic members of the first connector are proximally located and are arranged in opposing polarities to create a magnetic relationship between the first connector and the second connector, when the first connector is brought in proximity to the second connector.

In an embodiment, the set of electrical members of the second connector form electrical connection with the first set of electrical members of the first connector, when the first connector and the second connector are magnetically connected.

In an embodiment, the first set of electric members of the first connector are arranged in a pattern such that the second connector is connected in any direction to perform the charging operation in one the data synchronization mode and the optimal charging mode.

In an embodiment, the first connector automatically disconnects with the second connector when a non-axial force is applied.

Embodiments herein disclose a system to manage charging operations of an electronic device. The system includes a first connector attached to the electronic device. The first connector includes a set of electrical members and a set of magnetic members. A second connector is attached to a USB cable. The second connector comprises a set of magnetic members and a second set of electrical members. A proximal end of the first connector is adapted to fit into the charging receptacle of the electronic device and a distal end of the first connector is adapted to fit into a proximal end of the second connector. A proximal end of the second connector is adapted to fit into a distal end of the first connector and a distal end of the second connector is adapted to fit in a charging plug of the adaptor. The second set of electrical members of the second connector make contact with the first set of electrical members of the first connector to carry the electrical connection when the first connector and the second connector are magnetically connected. The set of electrical members of the first connector are arranged in a pattern such that the second connector is connected to the first connector in any direction to perform the charging operation in one of a data synchronization mode and an optimal charging mode based on a type of the electronic device.

Embodiments herein disclose an apparatus to manage charging operations of an electronic device. The apparatus includes a housing having a first end adapted to be physically connected to a power source and a second end adapted to be physically connected to the electronic device. One or more PCB(s) is disposed within the housing to provide conductive paths between the power source and the electronic device. A slide switch component is soldered on one side of the PCB in the housing with no other components in the vicinity, in order to provide a passageway. A switch member is displaceably mounted in the passageway such that the movable handle of the slide switch element can be moved to one of its two positions, to electrically activate one of a data synchronization mode and an optimal charging mode to perform the charging operation between the power source and the electronic device. The switch member is attached to a sheet metal member mounted for a longitudinal sliding movement relative to the movable handle of the slide switch element, which is soldered on the PCB, to activate one of the data synchronization mode and the optimal charging mode.

In an embodiment, the longitudinal sliding movement registers to enable data lines to perform the charging operation and the data synchronization operation between the power source and the electronic device in the data synchronization mode.

In an embodiment, the longitudinal sliding movement registers to disable data lines to perform the charging operation with maximum current between the power source and the electronic device in the optimal charging mode.

In an embodiment, the sheet metal member is formed using a sheet metal bending mechanism.

In an embodiment, the first end includes at least one of a first set of electrical members and a first set of magnetic members connected to the at least one PCB. A second end comprises at least one of a second set of magnetic members and a second set of electrical members connected to the at least one PCB.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which:

FIG. 1b is an exploded view of the system described in the FIG. 1, according to embodiments as disclosed herein;

FIG. 6a to FIG. 6k depict different arrangements of a switch member and a mode indicator on the second connector, according to an embodiment as disclosed herein;

FIG. 7a and FIG. 7b illustrate different configurations of the first connector, according to an embodiment as disclosed herein;

DETAILED DESCRIPTION OF EMBODIMENTS

Figure 1A:
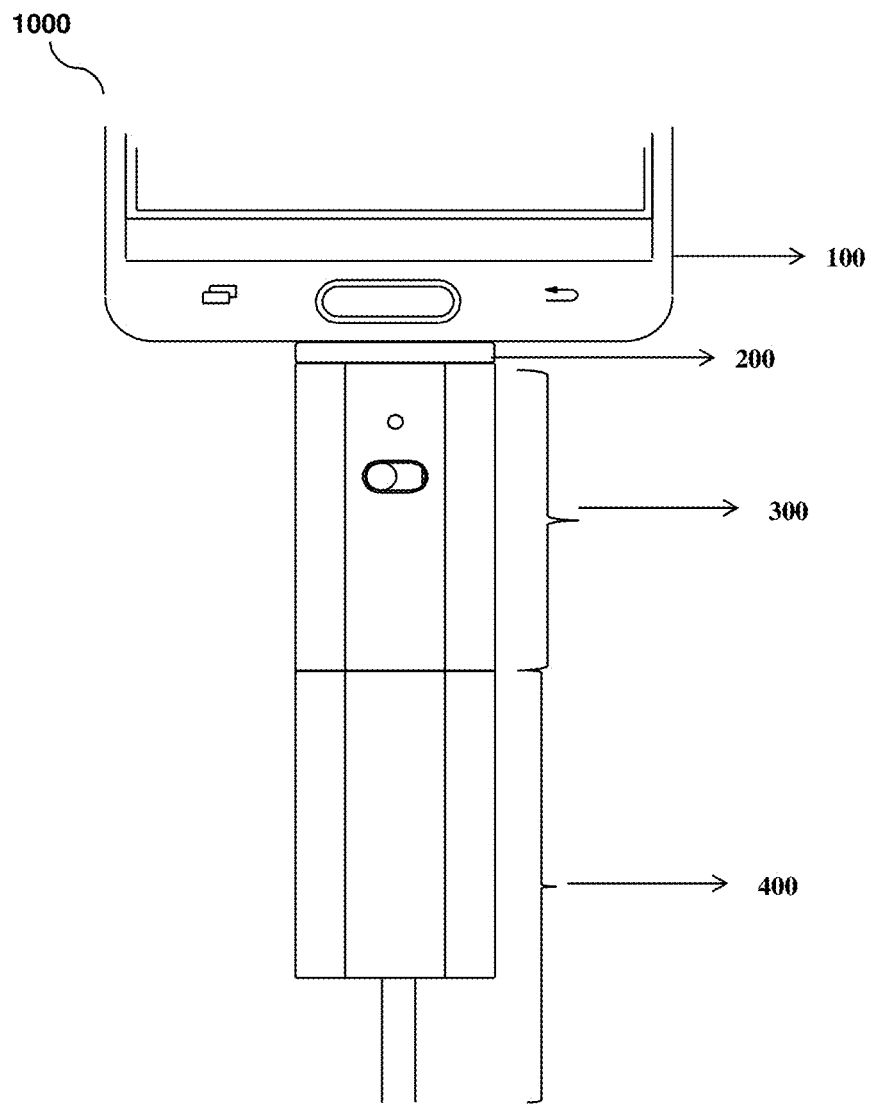
FIG. 1a illustrates a system in which an electronic device is connected to a power source through a first connector and a second connector, according to embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein disclose an apparatus to manage charging operations of an electronic device. The apparatus includes a first connector adapted to fit into a charging receptacle of the electronic device. A second connector is adapted to connect to the first connector. The second connector includes a switch member configured to detect a status of the second connector. The status of the second connector is in one of a data synchronization mode and an optimal charging mode. A charging member is configured to manage the charging operation based on the status of the second connector.

Unlike the conventional mechanisms, the proposed apparatus includes the charging member configured to detect that the status of the second connector is in the optimal charging mode. Further, the charging member switches the data lines to disable the data synchronization operation. Further, the charging member sets the voltage at the data lines based on the type of the electronic device. Further, the charging member performs the charging operation to charge the electronic device with maximum current. This results in improving the fast charging operation in the electronic device.

Unlike the conventional mechanisms, in order to quickly charge the electronic device, when the electronic device is connected to a laptop or enables the data protection, the second connector can be set at the optimal charging mode by sliding the switch member towards the first connector.

Unlike the conventional mechanisms, in the optimal charging mode, the charging member inside the second connector activates an auto detection mode, which detects the type of the electronic device connected to the second connector and optimizes for fast charging. Further, in the optimal charging mode, the data sync is disabled, so no one can access the data of the electronic device or from a malware attack occurring due to the data sync.

Unlike the conventional mechanisms, the magnetic connection enables detaching of the cable when non-axial forces are applied, so that the cable detaches itself from the electronic device easily when the cable is accidentally yanked, thus protecting the electronic device from falling off. Further, it reduces stress on the cables and charging sockets thus preventing frayed cables and broken sockets/locking mechanisms.

Referring now to the drawings and more particularly to FIGS. 1a through 8b, where similar reference characters denote corresponding features consistently throughout the figure, there are shown preferred embodiments.

FIG. 1a illustrates a system 1000 in which an electronic device 100 is connected to a power source 400 through a first connector 200 and a second connector 300, according to embodiments as disclosed herein. FIG. 1b is an exploded view of the system 1000 described in the FIG. 1, according to an embodiment as disclosed herein. The system 1000 includes the electronic device 100, the first connector 200, the second connector 300, and the power adaptor 400. The electronic device 100 can be, for example but not limited to, a mobile phone, a Personal Digital Assistance (PDA), or the like. In an embodiment, in order to charge the electronic device 100, a data communication port, for example, Universal Serial Bus (USB) port of the electronic device 100 is connected with the power source 400 through the first connector 200 and the second connector 300. The power line of the USB port is connected to a battery of the electronic device 100.

In another embodiment, in order to charge the electronic device 100, a data communication port, for example, USB port of the electronic device 100 is connected with a USB port of another device (e.g., laptop computer, car charging port, or the like) through the first connector 200 and the second connector 300. The functions, the operations, and the arrangements of the system 1000 are explained in conjunction with the FIG. 1b.

As shown in the FIG. 1b, the first connector 200 is adapted to fit into a charging receptacle (not shown) of the electronic device 100. The second connector 300 is adapted to connect to the first connector 200. The second connector 300 includes a switch member (not shown) configured to detect a status of the second connector 300. In an embodiment, the switch member can be a push button. In an embodiment, the switch member can be a capacitive sensor circuit. In an embodiment, the switch member can be a pressure sensor circuit. In an embodiment, the switch member can be a mechanical switch (e.g., button).

In an embodiment, the status of the second connector 300 is in the data synchronization mode. In an embodiment, the status of the second connector 300 is in the optimal charging mode. Based on the status of the second connector 300, a charging member (not shown) is configured to perform the charging operation.

In an embodiment, the charging member is configured to detect that the status of the second connector 300 is in the optimal charging mode. Further, the charging member is configured to switch data lines to disable a data synchronization operation. The data synchronization operation is explained in conjunction with the FIG. 4a. Further, the charging member is configured to set a voltage at the data lines based on a type of the electronic device 100. In an embodiment, type of the electronic device 100 can be determined based on an Original Equipment Manufacturer (OEM). In an embodiment, type of the electronic device 100 can be determined based on a Standard Organization Body (SOB). In an example, type of the electronic device 100 can be, for example, but not limited to an iPhone, Android phone, windows Phone, or the like.

Further, the charging member is configured to perform the charging operation to charge the electronic device 100 with maximum current. In an example, the OEM designing the mobile phone with maximum charging operation capacity is 2 Amperes means, the charging member supports the maximum charging operation capacity of 2 Amperes during charging of the mobile phone.

In an embodiment, the voltage at the data lines are dynamically determined based on a dedicated charging port standard of the USB battery charging specification set by the OEM of the electronic device 100.

In an embodiment, the charging member is configured to detect that the status of the second connector 300 is in the data synchronization mode. Further, the charging member is configured to enable the data synchronization operation. After enabling the data synchronization operation, the charging member is configured to allow for both the charging operation and the data synchronization operation between the power source 400 and the electronic device 100.

In an embodiment, the data lines are controlled by the power source 400 connected to the distal end of the second connector 300.

In an example, the first connector 200 and the second connector 300 together are used for fast charging the mobile device. Further, the first connector 200 can be mechanically fit inside the mobile device charging receptacle and the second connector 300 accommodates the charging cable that can be fit mechanically within it. When the second connector 300 is brought near the first connector 200, the second connector 300 snaps and can be used for charging or transferring data. Further, when the second connector 300 is attached itself to the first connector 200, spring loaded pins inside the second connector 300, upon touching electrical contacts on the surface of the first connector 200, are compressed thus forming the electrical connection. Unlike the conventional mechanisms, in order to quickly charge the electronic device 100, when connected to the laptops or to enable the data protection, the second connector 300 can be set at the optimal charging mode by sliding the switch member towards the first connector 200. In an embodiment, the optimal charging mode, the data sync is disabled.

In an embodiment, the first connector 200 includes a set of electrical members (not shown) and a set of magnetic members (not shown). The magnetic members act as a reversible magnetic interface.

In an embodiment, a proximal end (not shown) of the first connector 200 is adapted to fit into the charging receptacle of the electronic device 100. The proximal end will act as a plug. The plug will fit into the charging receptacle of the electronic device 100. A distal end of the first connector 200 is adapted to fit into a proximal end of the second connector 300.

In an example, for iOS devices, the plug of the first connector 200 is redesigned in order to fit the minimalistic dimensions required in order to be aesthetically pleasing.

In an embodiment, the second connector 300 includes a set of electrical members (not shown) and a set of magnetic members (not shown).

In an embodiment, the set of magnetics members of the first connector magnetically connect the electronic device 100 with the second connector 300 and the set of electrical members of the first connector 200 electrically connect the electronic device 100 with the second connector 300.

In an embodiment, the set of magnetics members of the second connector 300 magnetically connect to the electronic device 100 through the first connector 200 and the second set of electrical members of the second connector 300 electrically connects to the electronic device 100 through the first connector 200.

In an embodiment, the first connector 200 connects to the second connector 300 when the set of electrical members 210 of the first connector 200 being adapted to mate with the set of electrical members of the second connector 300.

In an embodiment, the set of magnetic members of the first connector 200 are proximally located and are arranged in opposing polarities to create a magnetic relationship between the first connector 200 and the second connector 300, when the first connector 200 is brought in proximity to the second connector 300.

In an embodiment, the set of magnetic members of the first connector 200 are proximally located and are arranged in opposing polarities to create a magnetic relationship between the first connector 200 and the second connector 300, when the first connector 200 is brought in proximity to the second connector 300.

In an embodiment, the set of electrical members of the second connector 300 form electrical connection with the first set of electrical members of the first connector 200, when the first connector 200 and the second connector 300 are magnetically connected.

In an embodiment, the first set of electric members of the first connector 200 are arranged in a pattern such that the second connector 300 is connected in any direction to perform the charging operation in the data synchronization mode or the optimal charging mode.

In an embodiment, the first connector 200 automatically disconnects with the second connector 300 when a non-axial force is applied. This results in avoiding the accidental fallen of the electronic device 100.

In an embodiment, while usage, the first connector 200 is meant to be always fixed inside the electronic device 100 and the second connector 300 is meant to be always fixed to the charging plug of the charging cable.

The FIG. 1a and FIG. 1b show the limited overview of the system 100 but, it is to be understood that other embodiments are not limited thereto. Further, the system 1000 can include any number of hardware or software components communicating with each other. Further, the labels first and second are only used for illustrative purpose and not limiting the scope of the invention.

Figure 2A:
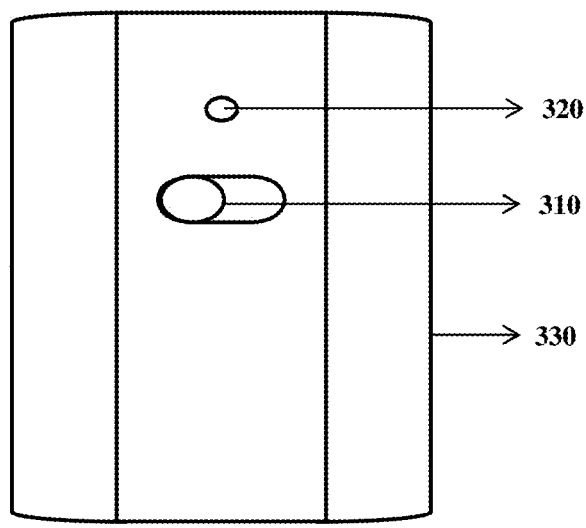
FIG. 2a is a front view of the second connector, according to embodiments as disclosed herein.

FIG. 2a is a front view of the second connector 300, according to embodiments as disclosed herein. The second connector 300 includes the switch member 310, a mode indicator 320, and a housing 330. The operations and functions of the switch member 310 are explained in conjunction with the FIG. 1b. The mode indicator 320 (e.g., Light Emitting Diode (LED), or the like) is configured to indicate whether the electronic device 100 is in a fully charged mode. In an embodiment, the mode indicator 320 is configured to indicate whether the electronic device is in a partially charging mode. In an embodiment, the mode indicator 320 is configured to indicate whether the electronic device 100 is connected with the power source 400 or not.

The housing 330 includes a first end adapted to be physically connected to the power source 400. In an embodiment, the housing 330 can be made of a metal, a plastic or any other suitable material. A second end of the housing 330 is adapted to be physically connected to the first connector 200.

Figure 2B:
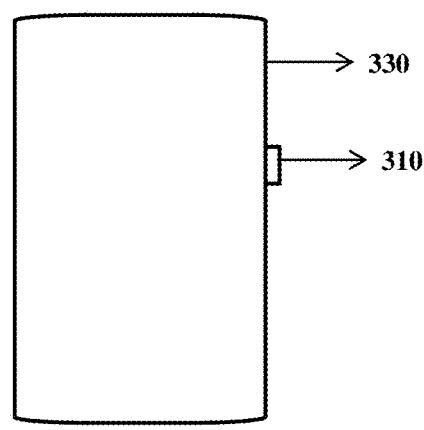
FIG. 2b is a side view of the second connector, according to embodiments as disclosed herein.
Figure 2C:
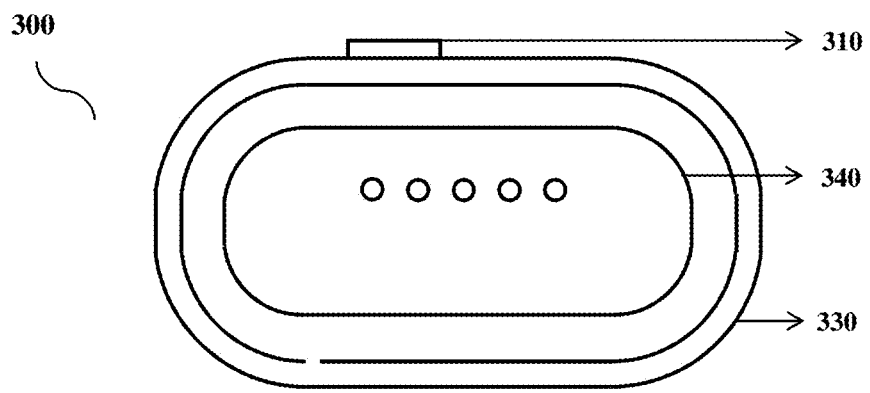
FIG. 2c is a top view of the second connector, according to embodiments as disclosed herein.
Figure 2D:
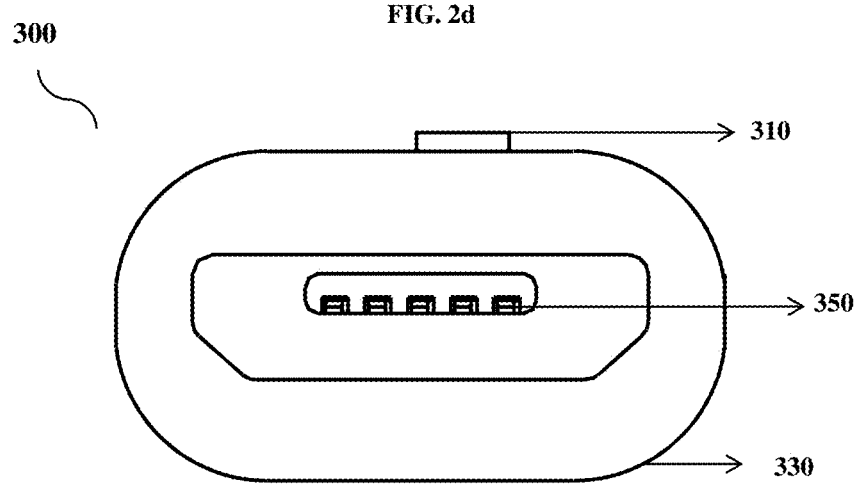
FIG. 2d is a bottom view of the second connector, according to embodiments as disclosed herein.
Figure 2E:
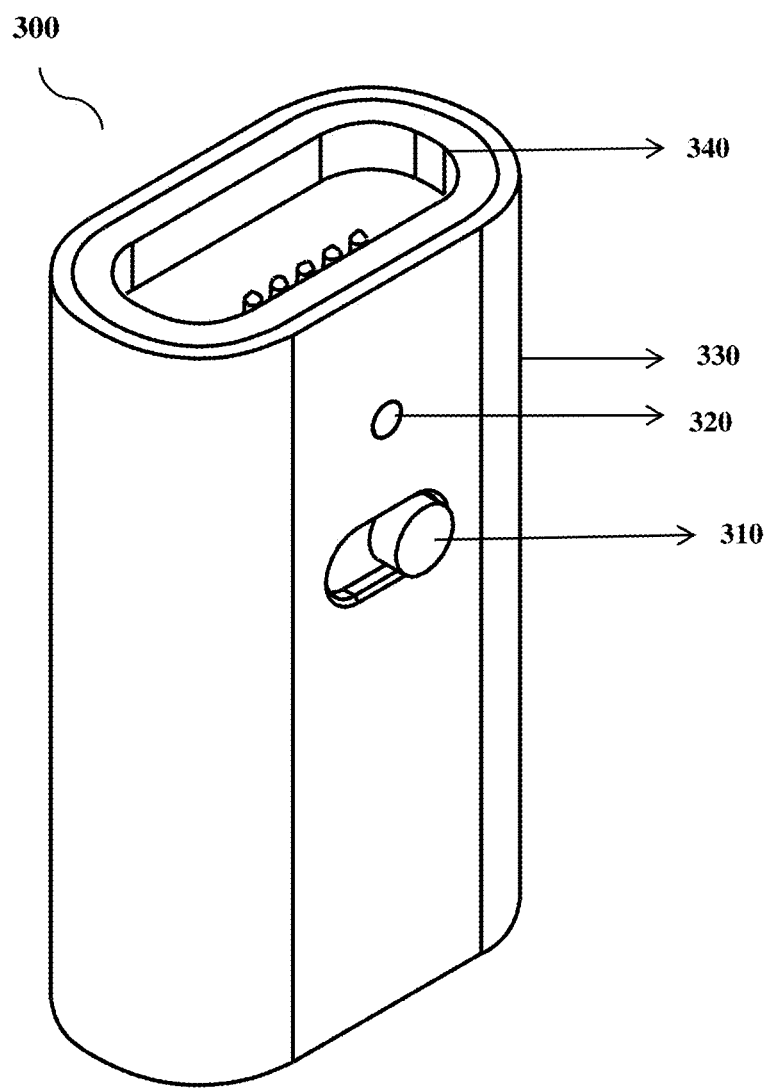
FIG. 2e is a perspective view of the second connector, according to embodiments as disclosed herein.

A side view of the second connector 300 is shown in the FIG. 2b. In an embodiment, the proximal end 340 of the second connector 300 is adapted to fit into the distal end of the first connector 200 as shown in the FIG. 2c, and the distal end 350 of the second connector 300 is adapted to fit into the charging plug 400 as shown in the FIG. 2d. A perspective view of the second connector 300 is shown in the FIG. 2e.

In an embodiment, the proximal end 340 of the second connector 300 is adapted to fit into the distal end of the first connector 200 and the distal end 350 of the second connector 300 is adapted to connect with the USB cable.

Figure 3A:
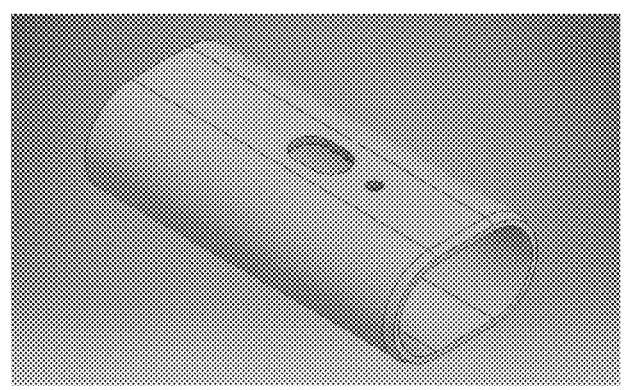
FIG. 3a is a perspective view of a housing of the second connector, according to embodiments as disclosed herein.

FIG. 3a is a perspective view of a housing of the second connector, according to embodiments as disclosed herein. Components (i.e., switch member 310, mode indicator 320, the PCB 360, and the slide switch member 380) are encased in the housing 330. The housing 330 can be a single part or two parts (i.e., upper half portion and lower half portion).

Figure 3B:
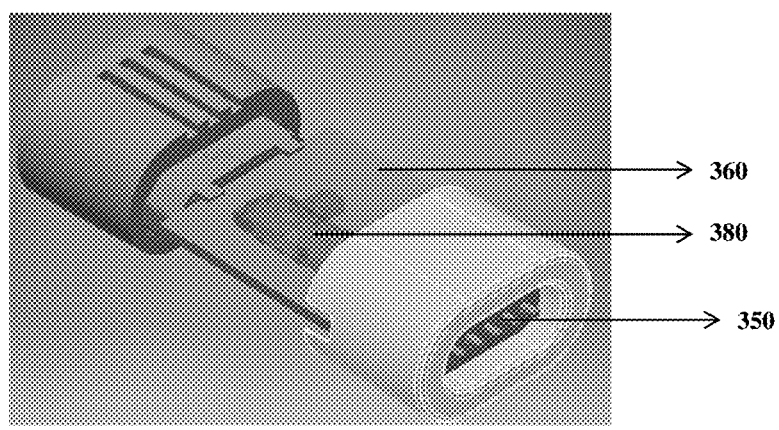
FIG. 3b is an exploded view of the second connector in which a PCB is disposed within the housing, according to embodiments as disclosed herein.
Figure 3C:
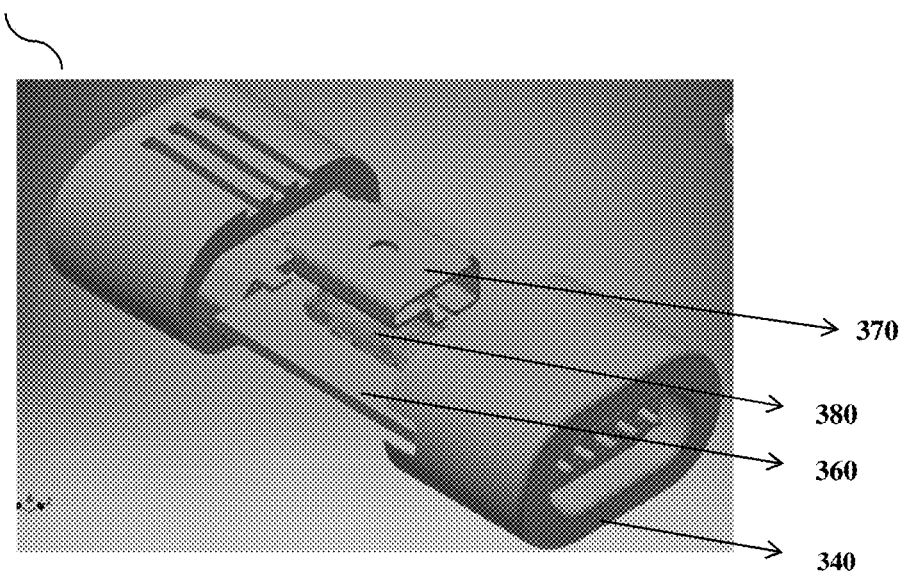
FIG. 3c and FIG. 3d are exploded views of the second connector in which a switch member is mounted on the PCB, according to embodiments as disclosed herein.

FIG. 3b is an exploded view of the second connector 300 in which the PCB 360 is disposed within the housing 330, according to embodiments as disclosed herein. The PCB 360 is disposed within the housing 330 to provide conductive paths (not shown) between the power source 400 and the electronic device 100 through the first connector 200. A slide switch element 380, a switch member 310 and an elongated sheet metal member 370 together provide a switch mechanism. As shown in the FIG. 3c, the slide switch element 380 is soldered on the PCB 360 with no other components in the vicinity while allowing for a passageway (not shown). The elongated sheet metal member 370 is displaceably mounted in the passageway such that the movable handle of the slide switch element can be moved to one of its two positions to mechanically activate one of the data synchronization mode and the optimal charging mode to perform the charging operation between the power source 400 and the electronic device 100.

In an embodiment, the switch member 310 is press-fitted onto the elongated sheet metal member 370 which is displaceably mounted for a longitudinal sliding movement relative to the movable handle of the slide switch element 380 that is soldered on the PCB 360 to activate one of the data synchronization mode and the optimal charging mode.

In an embodiment, the longitudinal sliding movement registers to enable the data lines to perform the charging operation and the data synchronization operation between the power source 400 and the electronic device 100 in the data synchronization mode.

In an embodiment, the longitudinal sliding movement registers to disable the data lines to perform the charging operation with maximum current between the power source 400 and the electronic device 100 in the optimal charging mode.

In an embodiment, the sheet metal member 370 is formed using a sheet metal bending mechanism.

In an embodiment, the slide switch element 380 is soldered at a defined position on the PCB 360. Further, the sheet metal member 370 is placed on the PCB 360 such that the slide switch element 380 is positioned below a side portion of the sheet metal member 370. The sheet metal member 370 includes an inserting hole, where the inserting hole is adapted support the switch member 310 to change the status of the second connector 300.

In an embodiment, one portion of the sheet metal member 370 is in a bendable shape. The bendable portion of the sheet metal member 370 is adapted carry the slide switch 380. The switch member 310 is made based on a computer numerical-controlled process. The switch member 310 is made of a soft metal like brass and coated with another material (e.g., steel, nickel or the like). Further, the sheet metal element 370 is made out of stainless steel, based on a metal stamping process.

Figure 3D:
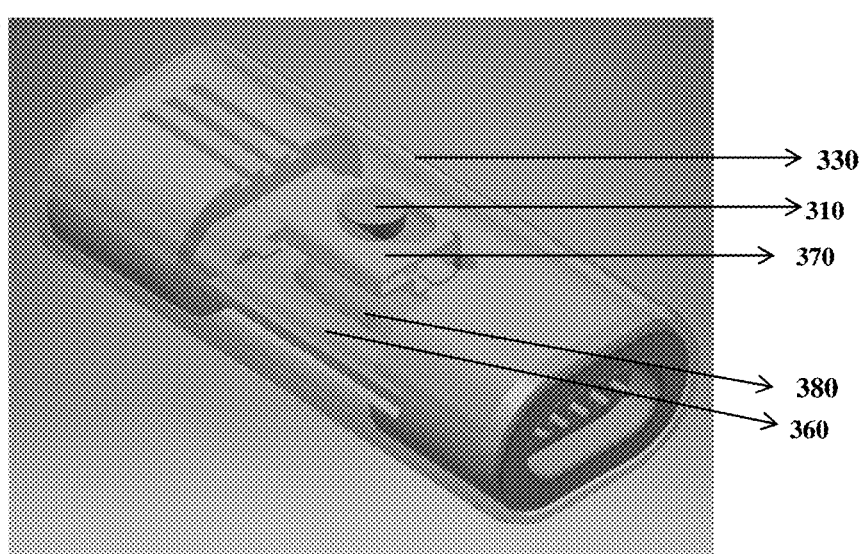
Figure 3E:
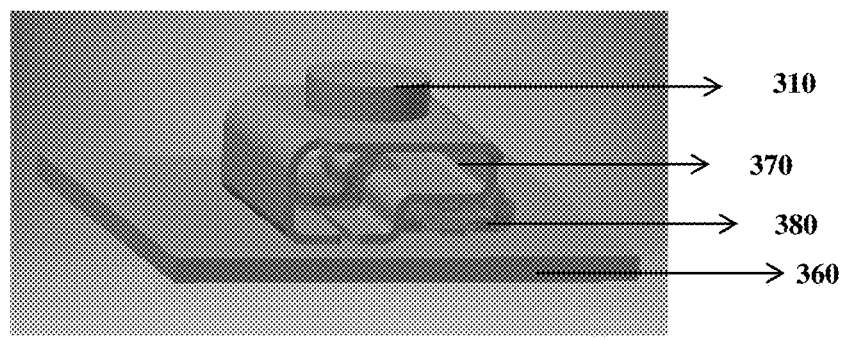
FIG. 3e is a perspective view the switch member mounted on the PCB, according to embodiments as disclosed herein.
Figure 3F:
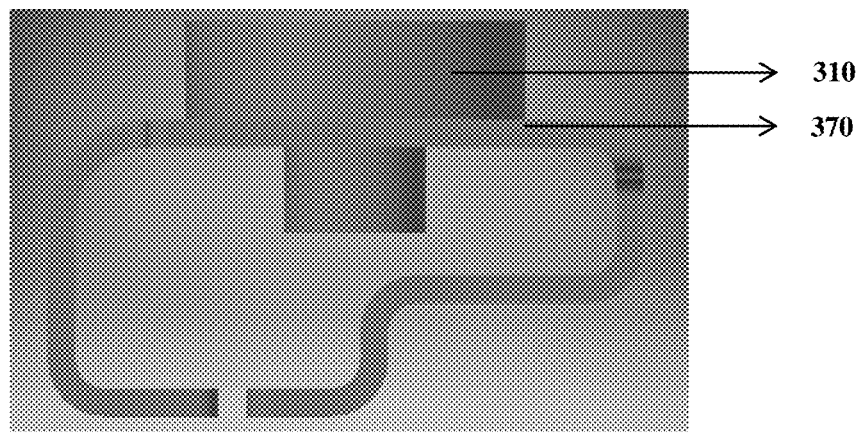
FIG. 3f is a perspective view the switch member comprising of a sheet metal member, according to embodiments as disclosed herein.

As shown in the FIG. 3d, the switch member 310 is placed in the inserting hole of the sheet metal member 370 (i.e., slide switch member 380 is not visible to outside). As shown in the 3e, the sheet metal member 370 is mounted on the PCB 360. Further, the switch member 310 is placed in the inserting hole of the sheet metal member 370 as shown in the FIG. 3f.

In an embodiment, the second connector 300 includes two PCBs (i.e., first PCB and second PCB) that are embedded inside the second connector 300. The slide switch 380 is mounted on the second PCB. The second PCB and the slide switch 380 are connected to the first PCB electrically by a conductive line (e.g., flexible PCB line, a wire, or the like).

In an embodiment, the switch member 310, the elongated sheet metal member 370, and the slide switch member 380 are placed on a top portion of the second connector 300. The switch member 310 is used to operate as a mechanical switch mounted on the second PCB inside the second connector 300. Further, the sheet metal member 370 is connected to the slide switch 380 by a mechanical arrangement.

In an embodiment, a top portion of the second PCB holds the slide switch 380 and the mode indicator 320. A bottom portion of the first PCB contains a fast charging Integrated Circuit (IC) (not shown) and pogo pins. On the corner of the first PCB, the receptacle is mounted for plugging in the cable.

In an embodiment, the first PCB and the second PCB are connected electrically through the flexible PCB or the wire. The switch member 310 is connected to the sheet metal member 370 by press-fit.

In an embodiment, the switch member 310, the elongated sheet metal member 370, the slide switch member 380 and the mode indicator 320 are placed at the top portion of the single PCB. The pogo pins, the IC, and the receptacle contacts are mounted at the bottom side of the PCB.

In an embodiment, the top portion of the second connector 300 has the switch member 310, the elongated sheet metal member 370, and the slide switch member 380 which supports a side to side sliding operation. The pogo pins are connected to the first PCB. The first PCB contains circuitry for the fast charging. The socket contains the receptacle part for the particular type of the cable. The contacts of the receptacle which carry the electrical connection from the cable when it is inserted in it are connected to the other end of the first PCB. The housing 330 also includes the second PCB on which the mechanical switch and the mode indicator 330 are mounted. The handle of the mechanical switch is mechanically connected to the switch member 310. The housing 330 can be made up of, for e.g., a plastic material, so that the top portion of the housing 330 is provided with the mode indicator 330. Further, the first PCB and the second PCB are electrically connected through wires or any other conductive material. The housing 330 also contains a magnet member placed around the pogo pins. The strength of the magnetic connection is in the range of, for e.g., 5-7 N.

In an embodiment, the structure of the second connector 200 will be mechanically stable even with repeated usage. Any improvisations on this aspect will be added based on the requirement and OEM perspectives.

Switch mechanism assembly: In an embodiment, the sheet metal member 370 is placed on the PCB 360 such that the slide switch element 380 is disposed below a side portion of the sheet metal member 370 as shown in the FIGS. 3b and 3c. Further, the housing 330 is slid over a body of the second connector 300 and an adhesive member (e.g., glue or the like) is added to fix the housing 330 onto the body. Further, the inserting hole of the sheet metal member 370 is visible over the housing 330. The switch member 310 is placed over the inserting hole (i.e., by a press fitting procedure as shown in the FIG. 3d).

Figure 4A:
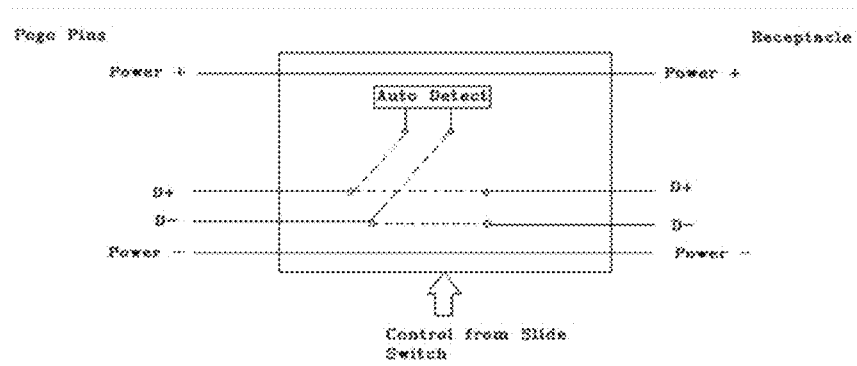
FIG. 4a is a circuit diagram of the switching functionality of a second connector, according to an embodiment as disclosed herein.

FIG. 4a is a circuit diagram of the switch member 310 and the elongated sheet metal member 370 of the second connector 300, according to an embodiment as disclosed herein. The slide switch 380 mounted on the PCB 360 is configured to send a signal to the circuit which switches data lines D+ and D− accordingly. In the optimal charging mode (i.e., fast charging mode), an IC in the circuit automatically detects the type of the electronic device 100 connected to it and sets voltage at D+ and D− as per Dedicated Charging Port (DCP) standard demanded by the device manufacturer. In the DCP mode, the mobile device charges with maximum current.

In the data synchronization mode, the data lines are connected across to the pogo pins directly. This is also referred as a Standard Downstream Port (SDP) mode. In the SDP mode, only data synchronization between a host (e.g., laptop, desktop, etc.) and the electronic device (e.g., smart phone, etc.) is performed.

In the DCP mode and the SDP mode, either one of the mode indicator 320 illuminate the current status of the electronic device 100. The mode indicator 320 has different color, thus differentiating between the modes. In an embodiment, different DCP Standards by various device manufacturers are DCP Divider 1, DCP Divider 2, USB Battery Charging Specification 1.2, and Chinese Telecommunication Industry Standard YD/T.

Figure 4B:
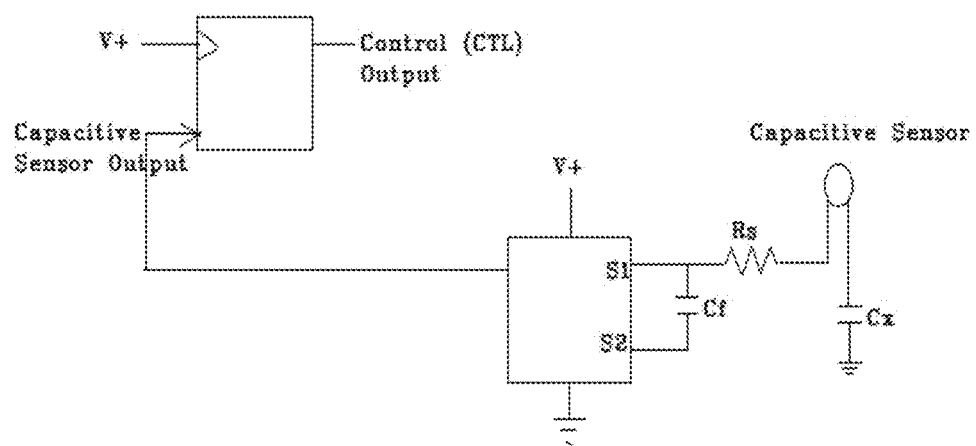
FIG. 4b illustrates the block diagram of the PCB circuit in which the slide switch component is replaced with a push button or capacitive sensor or pressure sensor, along with a flip-flop circuit, according to an embodiment as disclosed herein.

FIG. 4b illustrates the PCB on which the slide switch 380 is replaced with a push button or capacitive sensor or pressure sensor, along with a flip-flop circuit, according to an embodiment as disclosed herein. The capacitive sensor or the pressure sensor with the flip-flop circuit can be used in place of the mechanical switch, to generate a control signal.

Figure 5:
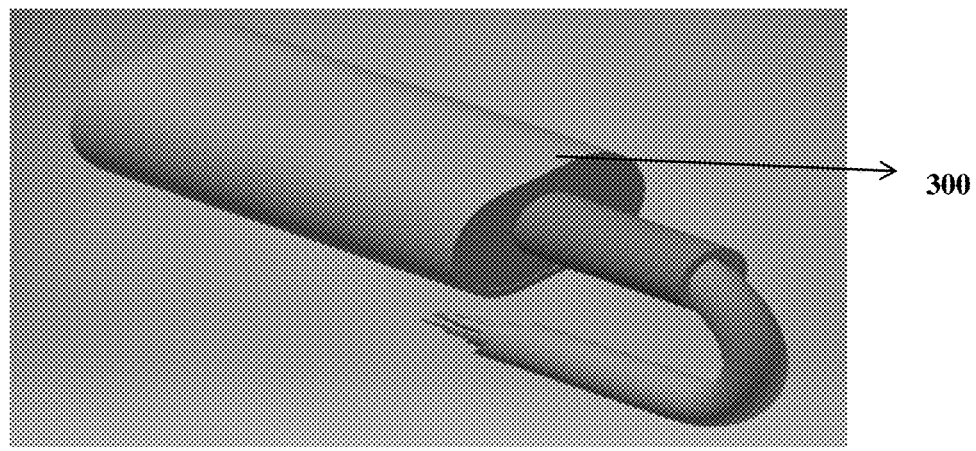
FIG. 5 is a perspective view depicting another configuration of the second connector in which a USB cable is mechanically connected to the second connector, according to an embodiment as disclosed herein.
Figure 6E:
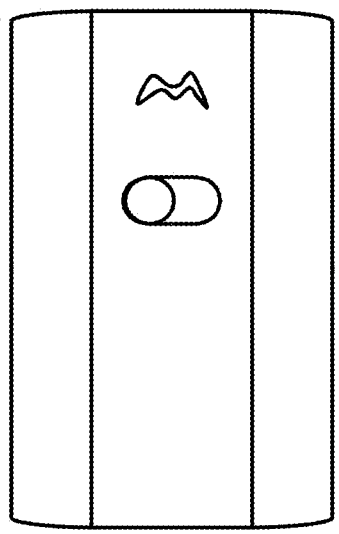
Figure 6F:
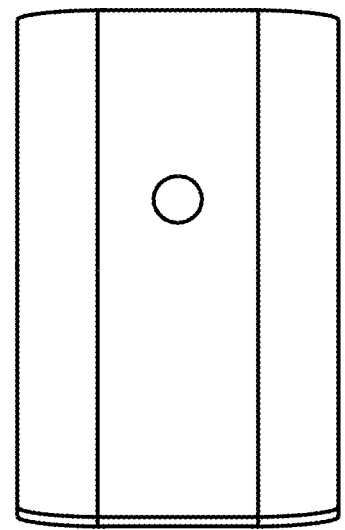
Figure 6G:
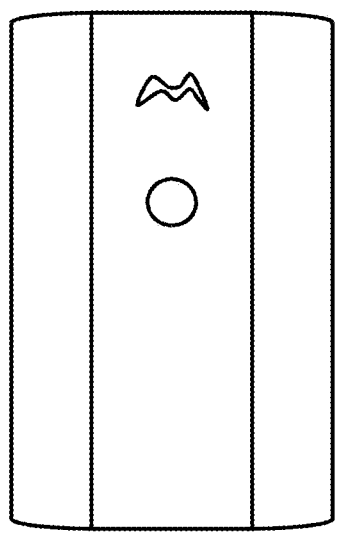
Figure 6H:
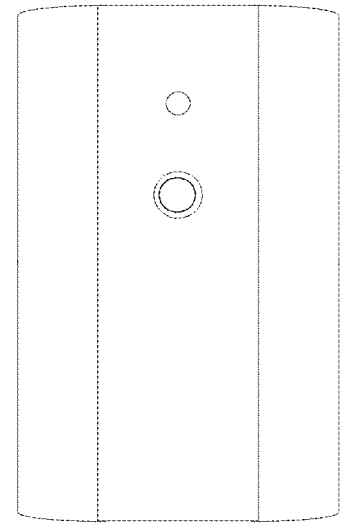
Figure 6I:
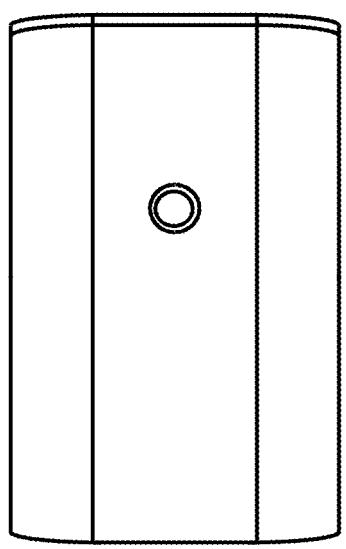
Figure 6J:
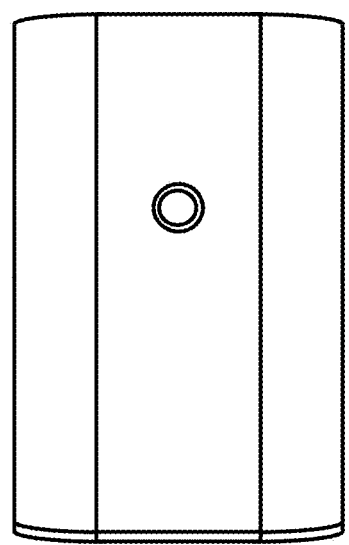
Figure 6K:
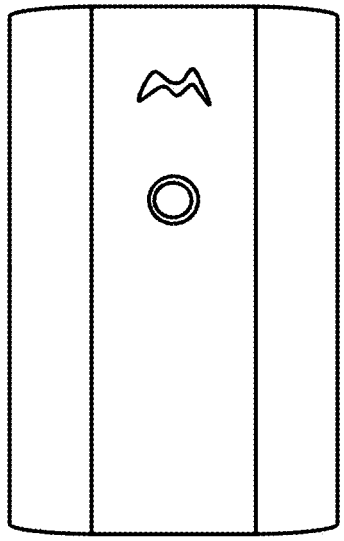

FIG. 5 is a perspective view depicting another configuration of the second connector 300 in which the USB cable is mechanically connected to the second connector 300, according to an embodiment as disclosed herein. The operations and functions of the second connector 300 are explained in conjunction with the FIG. 2a.

FIG. 6a to FIG. 6k depict different arrangements of the switch member 310 and the mode indicator 320 on the second connector 300, according to an embodiment as disclosed herein. Unlike the conventional mechanisms, in the fast charging mode, the IC inside the second connector 300 activates auto detection mode, which detects the type of the electronic device 100 connected to it and optimizes for fast charging. Further, in the optimal charging mode, the data sync is disabled, so no one can access the data of the electronic device 100 or from a malware attack occurring due to the data sync.

Further, the magnetic connection enables detaching of the cable when non-axial forces are applied, so that the cable detaches itself from the electronic device 100 easily when the cable is accidentally yanked, thus protecting the electronic device 100 from falling off. Further, it reduces stress on the cables and charging sockets thus preventing frayed cables and broken sockets/locking mechanisms.

Figure 7A:
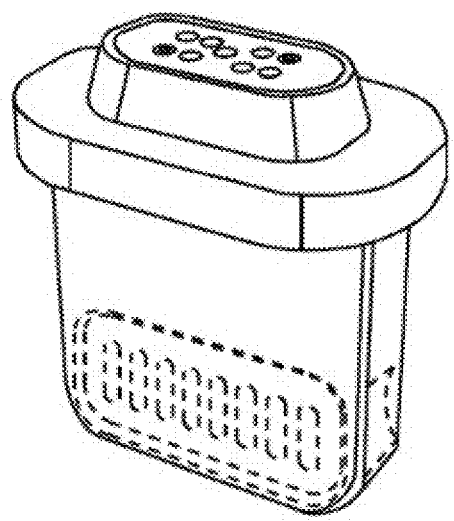
Figure 7A:
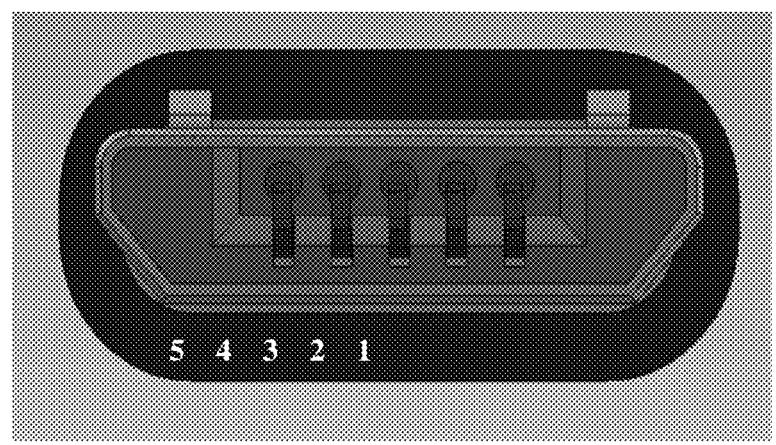

FIG. 7a and FIG. 7b illustrate different configurations of the first connector 200, according to an embodiment as disclosed herein. In an embodiment, a small PCB into the micro USB plug design is integrated to get reversible contacts. The dimensions are selected such that the PCB doesn't hinder the plug from being inserted properly into the electronic device receptacle. The dimensions of the ferromagnetic material are for initial assumption. If the magnet is too strong for our requirement, to reduce the size or change the shape. The solutions required are described below:

The following steps described below are followed to achieve the above mentioned solutions:

The method includes obtaining the magnet and the ferromagnetic material manufactured as per given dimensions. In an embodiment, initial magnet dimensions are taken assuming to give a magnetic pull force that is lesser than the charging plug removal force. Further, the method includes designing the pogo pins and the pogo pin contacts of required dimensions. Further, the method includes manufacturing the PCB and fully assemble (including pogo pins) and testing the PCB. Further, the method includes fabricating an initial prototype with the above magnet dimensions. Further, the method includes carrying out tests for the final prototype as per the industry standard.

The tests can be, for example but not limited to, a PCB test, charging indicator working function, current carrying capacity of the lines, durability tests, mechanical stability tests, an arrangement of the components, a fitting of the components, unaffected data transfer rates, any assembly issues (like firmly fixing pogo pins on the PCB etc.).

The disclosed fabrication process of the second connector 300 is susceptible to various modifications and alternative forms based on the requirement. The disclosed fabrication process of the second connector 300 is only for illustrative purpose. Specific embodiments thereof have been shown by way of example in the drawings and are herein described in detail. The figures and written description are not intended to limit the scope of the inventive concepts in any manner.

Figure 8A:
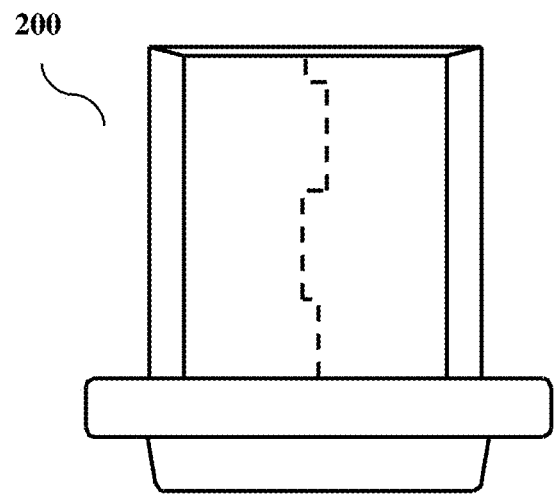
FIG. 8a is a front view of the first connector, according to embodiments as disclosed herein.
Figure 8B:
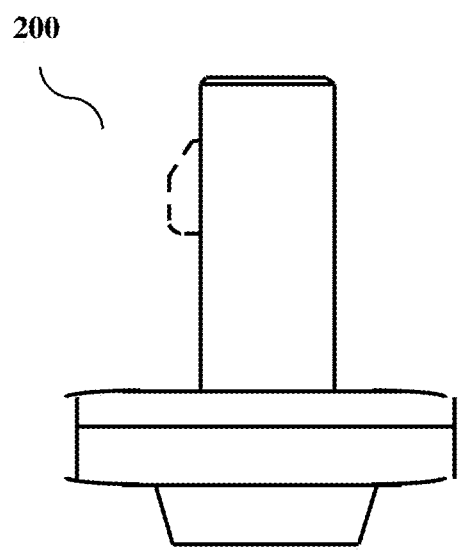
FIG. 8b is a side view of the first connector, according to embodiments as disclosed herein.

FIG. 8a is a front view of the first connector 200, according to embodiments as disclosed herein. In an embodiment, the first connector 200 includes a set of electrical members (not shown) and a set of magnetic members (not shown). The magnetic members act as a reversible magnetic interface. In an embodiment, a proximal end (not shown) of the first connector 200 is adapted to fit into the charging receptacle of the electronic device 100. The proximal end will act as a plug. The plug will fit into the charging receptacle of the electronic device 100. A distal end of the first connector 200 is adapted to fit into a proximal end of the second connector 300. Further, a side view of the first connector 200 is shown in the FIG. 8b, according to embodiments as disclosed herein.

In an embodiment, the first connector 200 contains a face having electrical contacts placed inside the housing. These electrical contacts are mounted on a PCB (not shown). The first connector 200 also contains a tail, which is a plug that can fit into a Micro-USB, Apple's lightning, or a USB Type-C device sockets. The electrical pins present in the tail as per the standards are connected to the PCB. So, when the first connector 200 is inserted into the electronic device 100, the electrical connection is carried forward from the electrical contacts on the face to the internal electronics of the electronic device 100. It is advantageous to use ferromagnetic steel instead of magnet in the first connector; as it is always inserted inside the electronic device 100 so it will not attract metals every time.

The embodiments disclosed herein can be implemented through at least one software program running on at least one hardware device and performing network management functions to control the elements. The elements shown in the FIGS. 1a to 8b include blocks which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. An apparatus to manage a charging operation of an electronic device, the apparatus comprising:
    a first connector adapted to fit into a charging receptacle of the electronic device;
    a second connector adapted to connect to the first connector, wherein the second connector comprising:
        a switch member configured to detect a status of the second connector, wherein the status of the second connector is in one of a data synchronization mode and an optimal charging mode; and
        a charging member configured to perform the charging operation based on the status of the second connector.

2. The apparatus of claim 1, wherein perform the charging operation based on the status of the second connector comprising:
    detect that the status of the second connector is in the optimal charging mode;
    switch data lines to disable a data synchronization operation;
    set a voltage at the data lines based on a type of the electronic device; and
    perform the charging operation to charge the electronic device with maximum current.

3. The apparatus of claim 2, wherein the voltage at the data lines are dynamically determined based on a dedicated charging port standard of the Universal Serial Bus (USB) battery charging specification set by an original equipment manufacture of the electronic device.

4. The apparatus of claim 1, wherein perform the charging operation based on the status of the second connector comprising:
    detect that the status of the second connector is in the data synchronization mode;
    enable a data synchronization operation; and
    allow the charging operation and the data synchronization operation between the power source and the electronic device.

5. The apparatus of claim 2, wherein the data lines are controlled by the power source connected to the distal end of the second connector.

6. The apparatus of claim 1, wherein the second connector further comprises at least one mode indicator configured to indicate at least one of whether the electronic device is in a fully charged, a partially charging, connection with a power source, and the status of the electronic device.

7. The apparatus of claim 1, wherein the first connector comprises a first set of electrical members and a first set of magnetic members, wherein the second connector comprises a second set of magnetic members and a second set of electrical members.

8. The apparatus of claim 7, wherein a proximal end of the first connector is adapted to fit into the charging receptacle of the electronic device and a distal end of the first connector is adapted to fit into a proximal end of the second connector.

9. The apparatus of claim 7, wherein a proximal end of the second connector is adapted to fit into a distal end of the first connector and a distal end of the second connector is one of adapted to fit into a charging plug of a USB cable, and connected to a USB cable.

10. The apparatus of claim 7, wherein the first set of magnetics members magnetically connect the electronic device with the second connector and the first set of electrical members electrically connects to the electronic device with the second connector.

11. The apparatus of claim 7, wherein the second set of magnetics members magnetically connect the electronic device with the first connector and the second set of electrical members electrically connects to the electronic device with the first connector.

12. The apparatus of claim 7, wherein the first connector connects to the second connector with a snap when the first set of magnetic members of the first connector being adapted to mate with the second set of magnetic members of the second connector and when the first set of electrical members of the first connector being adapted to mate with the second set of electrical members of the second connector.

13. The apparatus of claim 7, wherein the first set of magnetic members of the first connector are proximally located and are arranged in opposing polarities to create a magnetic relationship between the first connector and the second connector, when the first connector is brought in proximity to the second connector.

14. The apparatus of claim 7, wherein the second set of magnetic members of the first connector are proximally located and are arranged in opposing polarities to create a magnetic relationship between the first connector and the second connector, when the first connector is brought in proximity to the second connector.

15. The apparatus of claim 7, wherein the second set of electrical members of the second connector with the first set of electric members of the first connector form an electrical connection when the first connector and the second connector are magnetically connected.

16. The apparatus of claim 7, wherein the first set of electric members of the first connector are arranged in a pattern such that the second connector is connected in any direction to perform the charging operation in one of the data synchronization mode and the optimal charging mode.

17. The apparatus of claim 1, wherein the first connector automatically disconnects with the second connector when a non-axial force is applied.

18. A system to perform a charging operation of an electronic device, the system comprising:
a first connector attached to an electronic device, wherein the first connector comprises a first set of electrical members and a first set of magnetic members; and
a second connector attached to a USB cable, wherein the second connector comprises a second set of magnetic members and a second set of electrical members;
wherein a proximal end of the first connector is adapted to fit into the charging receptacle of the electronic device and a distal end of the first connector is adapted to fit into a proximal end of the second connector,
wherein a proximal end of the second connector is adapted to fit into a distal end of the first connector and a distal end of the second connector is adapted to fit into a charging receptacle of the adaptor,
wherein the second set of electrical members of the second connector make contact with the first set of electric members of the first connector to carry an electrical connection when the first connector and the second connector are magnetically connected,
wherein the first set of electrical members of the first connector are arranged in a pattern such that the second connector is connected to the first connector in any direction to perform the charging operation in one of a data synchronization mode and an optimal charging mode based on a type of the electronic device.

19. The system of claim 18, wherein the second connector comprising:
a switch member configured to detect a status of the second connector, wherein the status of the second connector is in one of the data synchronization mode and the optimal charging mode; and
a charging member configured to perform the charging operation based on the status of the second connector.

20. The system of claim 19, wherein the charging member is configured to perform the charging operation based on the status of the second connector comprising:
detect that the status of the second connector is in the optimal charging mode;
switch data lines to disable a data synchronization operation,
set a voltage at the data lines based on the type of the electronic device, and
perform the charging operation to charge the electronic device with maximum current.

21. The system of claim 19, wherein the charging member is configured to perform the charging operation based on the status of the second connector comprising:
detect that the status of the second connector is in the data synchronization mode;
enable the data synchronization operation; and
allow the charging operation and the data synchronization operation between the power source and the electronic device.

22. The system of claim 20, wherein the voltage at the data lines are dynamically determined based on a dedicated charging port standard of the Universal Serial Bus (USB) battery charging specification set by an original equipment manufacturer of the electronic device.

23. The system of claim 19, wherein the second connector further comprises at least one mode indicator configured to indicate at least one of whether the electronic device is in a fully charged, a partially charging, connection with a power source, and the status of the electronic device.

24. The system of claim 18, wherein the first connector automatically disconnects with the second connector when a non-axial force is applied.

25. An apparatus to manage a charging operation of an electronic device, the apparatus comprising:
a housing having a first end adapted to be physically connected to a power source, and a second end adapted to be physically connected to an electronic device;
at least one PCB disposed within the housing to provide conductive paths between the power source and the electronic device;
an elongated casing comprising a passageway mounted on the at least one PCB in the housing, wherein the at least one PCB is placed in the passageway of the elongated casing;
a switch member displaceably mounted in the passageway to electrically activate one of a data synchronization mode and an optimal charging mode to perform the charging operation between the power source and the electronic device; and
a slide switch mounted on the at least one PCB, wherein the slide switch is placed completely internal to the elongated casing.

26. The apparatus of claim 25, wherein the switch member is attached to a sheet metal member mounted for a longitudinal sliding movement relative to a movable handle of the slide switch mounted on the at least one PCB to activate one of the data synchronization mode and the optimal charging mode.

27. The apparatus of claim 26, wherein the longitudinal sliding movement registers to enable data lines to perform the charging operation and the data synchronization operation between the power source and the electronic device in the data synchronization mode.

28. The apparatus of claim 26, wherein the longitudinal sliding movement registers to disable data lines to perform the charging operation with maximum current between the power source and the electronic device in the optimal charging mode.

29. The apparatus of claim 26, wherein the sheet metal member is formed using a sheet metal bending mechanism.

30. The apparatus of claim 25, wherein apparatus further comprising at least one mode indicator configured to indicate at least one of whether the electronic device is in a fully charged, a partially charging, connection with a power source, and a status of the electronic device.

31. The apparatus of claim 25, wherein the first end comprises at least one of a first set of electrical members and a first set of magnetic members connected to the at least one PCB, wherein the second end comprises at least one of a second set of magnetic members and a second set of electrical members connected to the at least one PCB.

* * * * *